Sept. 15, 1959  W. H. MAYVILLE  2,904,309
WHEEL LIFT
Filed Oct. 29, 1956  2 Sheets-Sheet 1

INVENTOR.
WALTER H. MAYVILLE

Sept. 15, 1959 W. H. MAYVILLE 2,904,309
WHEEL LIFT
Filed Oct. 29, 1956 2 Sheets-Sheet 2

INVENTOR.
WALTER H. MAYVILLE

United States Patent Office 2,904,309
Patented Sept. 15, 1959

2,904,309
WHEEL LIFT

Walter H. Mayville, Bremerton, Wash.

Application October 29, 1956, Serial No. 619,080

3 Claims. (Cl. 254—131)

This invention relates to wheel lifting and positioning devices for automobiles or the like.

It is an object of the present invention to provide a wheel lift which will raise the wheel and tire into position on the wheel and hold it there while the cap bolts or nuts are being put on.

It is another object of the present invention to provide a wheel lift of the above type which is particularly designed for changing tires or working on brakes or wherein even a woman or child can change any tire with the present invention.

It is still another object of the present invention to provide a wheel lift of the above type which provides the user with all the tool necessary to change a tire with the exception of the jack and which may be conveniently stored in the car when not in use.

It is still another object of the present invention to provide a wheel lift of the above type which facilitates the changing of the tire during wet and muddy weather or when there is snow or ice on the ground.

For other objects and for a better understanding of the invention reference may be had to the following detailed description taken in connection with the accompanying drawing, in which.

Figure 1:
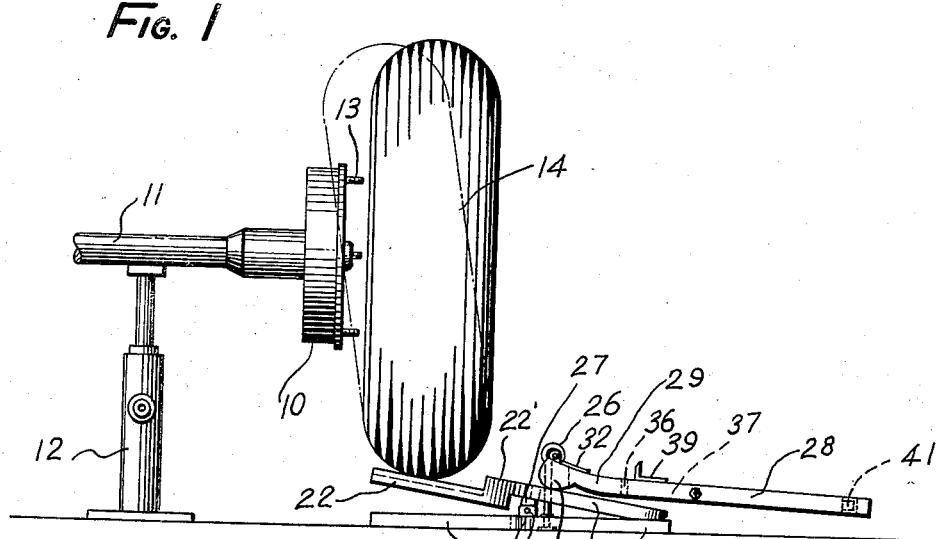
Figure 1 is a side elevational view of a preferred embodiment of the present invention shown in operative use lifting a wheel so that it can be placed upon the studs of the brake drum.

Referring now more in detail to the drawing, 10 represents the brake drum of the vehicle mounted on the axle 11 which is in turn supported in the raised position by the jack 12, the drum 10 being provided with the usual mounting studs 13 for securing thereon the wheel 14, in a manner well known to those skilled in the art. The wheel 14 includes the usual hub portion 15 as well as the hub cap 16.

In the practice of my invention, an improved wheel lift and tire changing device is provided and includes the flat base member 17 provided at one end with the inwardly extending rectangular cutout portion 18 having the semicircular inner end 19. A U-shaped mounting bracket 20 is fixedly secured to the central portion of the base member 17 inwardly of the cutout portion 19, a transverse pin 21 connecting the sides of the bracket.

Figure 2:
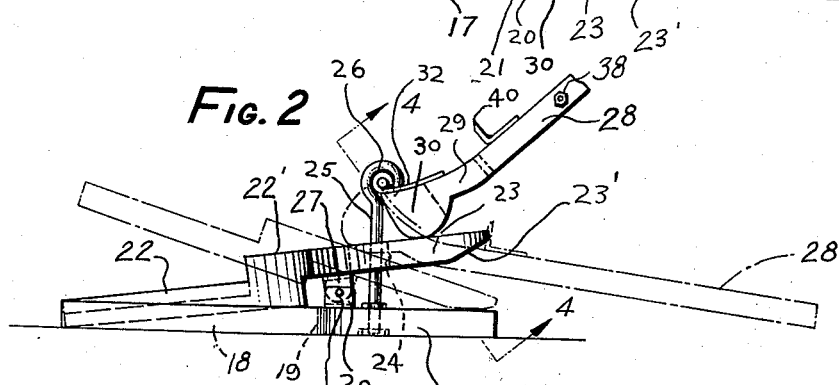
Fig. 2 is an enlarged side elevational view of the invention shown alone and illustrating in phantom the cam actions of the device and illustrating the tool in its extreme positions.
Figure 3:
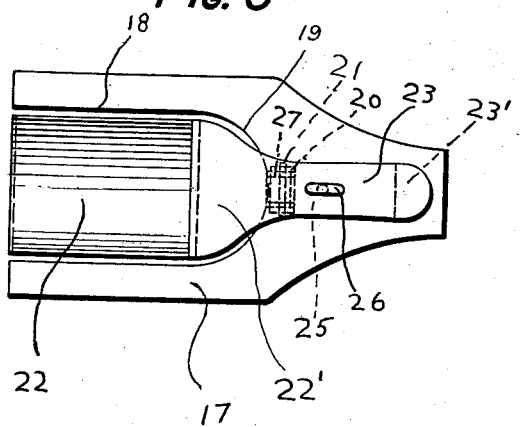
Fig. 3 is a top plan view of the base portion of the tool.
Figure 4:
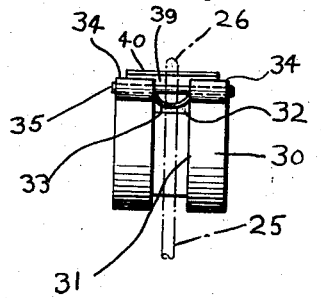
Fig. 4 is an end elevational view of the cam handle portion of the tool taken along the line 4—4 of Fig. 2.

A flat rectangular lifting member 22 adapted to fit within the cutout portion 18 is provided with a concave upper surface and is integrally formed at its inner end with the semicircular vertically raised portion 22' which is in turn integrally formed with the elongated shank 23 which extends parallel to the lifting portion 22 but is vertically displaced upwardly thereabove (Fig. 2), the outer end of the shank 22 having the bevelled undersurface 23'.

The shank 23 is provided with an elongated slot 24 which receives upwardly therethrough the vertical stud 25 suitably secured to the base member 17 and which terminates at its upper end in the hook portion 26.

The shank 23 intermediate the slot 24 and the thickened portion 22' is pivotally mounted between the sides of the bracket 20 on pin 21 by means of the correspondingly shaped bracket 27 suitably secured to the undersurface thereof, the sides of the bracket 27 being positioned within the sides of the bracket 20 and being rotatably mounted on pin 21. Thus, the lifting member 22, 22', 23 can move from the extreme position shown in full lines in Fig. 2 to that shown in phantom, the bevelled undersurface 23' abutting the upper surface of the member 17 when in the latter position. It will be noted that the lifting portion 22 with the concave upper surface in one extreme position extends downwardly into the cutout portion 18 so as to facilitate the positioning thereon of the wheel 14 within the hollow thus provided.

Means are provided for moving the lifting member 22 upwardly to the full line position of Fig. 1 so as to raise the wheel 14 onto the mounting studs 13 and include an elongated handle 28 integrally formed at one end with the upwardly curved portion 29 which is in turn integrally formed with the enlarged cam 30 adapted to abut the upper surface of shank 23. The cam surface or enlargement 30 is provided with a central vertical slot 31 which divides the same into oppositely disposed portions adapted to receive therebetween the stud 25 as will hereinafter became clear. Means are provided for pivotally connecting the forward upper end of the cam 30 to the eye 26 so that upon lowering the handle 28 the cam action will raise the lifting member 22 and the tire and wheel 14 to the position of Fig. 1 and include a plate 32 suitably secured to the upper surface of the cam member 30 and bridging the central slot 31, the plate 32 having an inwardly extending central cutout 33 to provide clearance for the hook 26. The forward edge of the plate 32 on opposite sides of the central slot 33 therein is formed with the cylindrical mounting portions 34 which fixedly mount the opposite ends of the transverse pin 35, the latter being received within the eye 26 and abutting the upper portion of the latter when the handle 28 is moved downwardly whereby to complete the pivotal mounting of the cam 30 to the stud 25 in contact with the upper surface of shank 23, this pivotal mounting being easily disconnected.

In operation, the handle 28 is raised (Fig. 2) to release the shank 23 and to permit the same to move upwardly as the lift member 22 moves downwardly under its own weight about the pin 21 to bring the lift member into the wheel receiving position whereupon the wheel 14 is mounted therein by rolling the same across the base member 17 and into the hollow thus provided which will retain the wheel thereat. The handle 28 is then lowered to raise the lift member 22 by the action of the cam 30 which motion moves the wheel 14 into position to be placed on the mounting studs 13, after which the handle 28 may be released. Thus, a minimum effort is required in the operation which may be performed by a woman or child.

In the further practice of my invention, the handle 28 is provided with the longitudinal centrally positioned slot 36 which receives therewithin the auxiliary handle 37, the handle 37 being pivotally mounted within the slot 36 on the handle 28 by means of a nut and bolt assembly 38 so that the handle 37 will lie within handle 28 during the positioning and raising of the wheel onto the mounting studs as previously described. Sufficient clearance is provided between the ends of the slot 36 and the auxiliary handle 37, as will be obvious. A right angled bracket 39 of steel or other suitable material having a prying edge 40 is suitably secured to one end of the auxiliary handle 37 and upon rotation of the handle 37 out of handle 28, the prying edge 40 may be used for removing the hub cap 16 during the tire changing operation.

Figure 5:
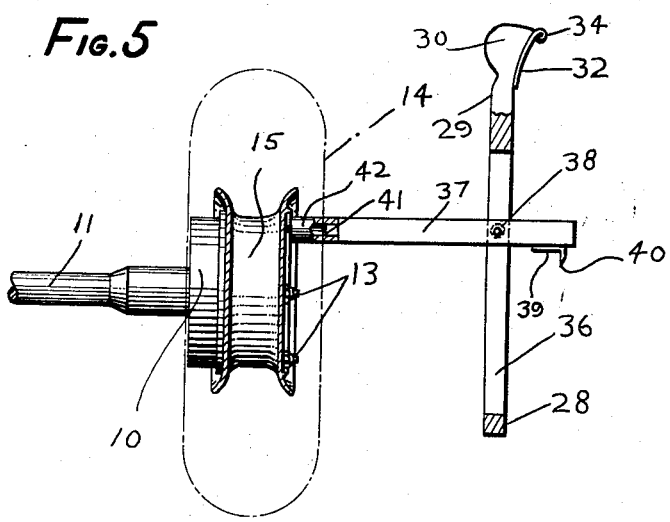
Fig. 5 is a side elevational view shown partly in section illustrating the use of the inner pivotal member being used to tighten hold down nuts on the mounting studs of the brake drums.
Figure 6:
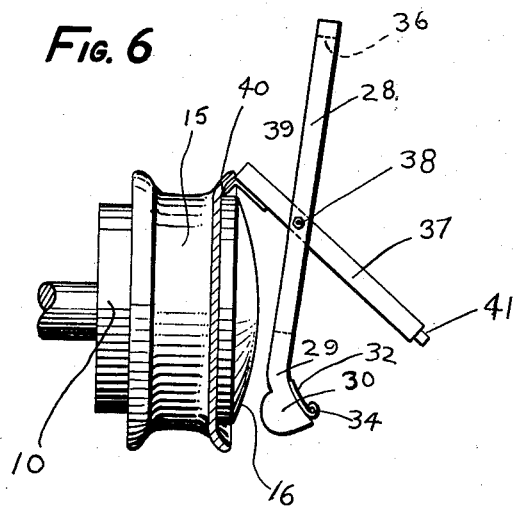
Fig. 6 is a side elevational view of the other end of the pivotable member being used to remove the hub cap.

The other end of the auxiliary handle 37 is formed with a reduced angular extension 41 which is adapted to receive thereon the separable drive socket 42 for tightening the nuts onto the mounting studs, as shown in Fig. 5. In such event, the handle 28 which is disposed at right angles to the handle 37 can be used for spinning the drive socket.

It should now be apparent that there has been provided a wheel lift which is designed to lift the wheel and tire into place and hold it there while the cap bolts or nuts are put onto the mounting studs.

It should also be apparent that the wheel may be changed by anyone, even a woman or child, and that all the tools needed to change the tire are provided with the exception of a jack. The device may be made of lightweight metal and manufactured at relatively inexpensive cost and sold to any garage or service station or parts house. It is particularly useful during wet and muddy weather and when there is snow and ice on the ground.

While various changes may be made in the detail construction, it shall be understood that such changes shall be within the spirit and scope of the present invention as defined by the appended claims.

What I claim as new and desire to protect by Letters Patent of the United States is:

1. A wheel lift for raising a wheel into alignment with mounting studs comprising, in combination, a flat base member on to which the wheel to be lifted may be rolled, said base member having an inwardly extending cutout portion of greater length than the width of the wheel, a separable lifting member adapted to fit downwardly within said cutout portion at one end at the outer end of the cutout portion, means pivotally mounting the other end of the lifting member on to the top of said base member, the surface of said lifting member being concave to receive therewithin the wheel, manually operable cam lever means for raising and lowering said lifting member whereby to move the wheel on to the mounting studs, said lifting member at its inner end having a vertically enlarged portion adapted to fit downwardly within the inner end of the cutout portion, a shank portion connected to the upper portion of said vertically enlarged portion extending parallel to said lifting member vertically spaced thereabove and extending in the opposite direction, bracket means rotatably mounting the undersurface of said shank member upon the upper surface of said base member near the inner end of said cutout portion, said cam lever means comprising a vertical stud secured to said base member, said shank having an elongated slot receiving said stud upwardly therethrough to permit the rotation of said shank about said bracket means, an elongated handle having a cam surface at one end thereof bearing upon the upper surface of said shank, and means pivotally connecting the forward upper portion of said cam surface to the upper end of said stud whereby upon rotation of said handle about said pivotal means, said cam surface will bear upon the upper surface of said shank and raise or lower said lifting member.

2. A wheel lift according to claim 1, said handle having an inwardly extending central longitudinal slot adapted to receive therewithin said stud, a transverse pin mounted across the top forward portion of said handle and bridging said slot, said stud at the upper end thereof being formed with an open eye member receiving said pin therethrough whereby upon rotational movement of said handle downwardly, the pin will engage the interior of said eye member at the top thereof to permit the pivotal movement of said handle about said eye member.

3. A wheel lift according to claim 2, the undersurface of said shank portion at the end thereof remote from said vertically enlarged portion being beveled so as to abut the upper surface of said base member when said lifting member is in the raised position.

References Cited in the file of this patent
UNITED STATES PATENTS

| | | |
|---|---|---|
| 1,957,126 | Appel | May 1, 1934 |
| 2,313,714 | Shock | Mar. 9, 1943 |
| 2,504,345 | Nellis | Apr. 18, 1950 |
| 2,701,707 | Miller | Feb. 8, 1955 |